US008859931B2

(12) United States Patent
Boulos et al.

(10) Patent No.: US 8,859,931 B2
(45) Date of Patent: Oct. 14, 2014

(54) PLASMA SYNTHESIS OF NANOPOWDERS

(75) Inventors: Maher I. Boulos, Sherbrooke (CA); Jerzy Jurewicz, Sherbrooke (CA); Jiayin Guo, Sherbrooke (CA); Xiaobao Fan, Sherbrooke (CA); Nicolas Dignard, Sherbrooke (CA)

(73) Assignee: Tekna Plasma Systems Inc., Sherbrooke (CA)

( * ) Notice: Subject to any disclaimer, the term of this patent is extended or adjusted under 35 U.S.C. 154(b) by 1156 days.

(21) Appl. No.: 11/683,792

(22) Filed: Mar. 8, 2007

(65) Prior Publication Data

US 2007/0221635 A1 Sep. 27, 2007

Related U.S. Application Data

(60) Provisional application No. 60/779,968, filed on Mar. 8, 2006.

(51) Int. Cl.

| | |
|---|---|
| ***B23K 9/00*** | (2006.01) |
| ***B01J 8/02*** | (2006.01) |
| ***H05H 1/42*** | (2006.01) |
| ***B22F 9/12*** | (2006.01) |

(52) U.S. Cl.

CPC .............. *H05H 1/42* (2013.01); *B22F 2202/13* (2013.01); *B22F 9/12* (2013.01)

USPC ...... 219/121.59; 423/659; 423/289; 423/345; 423/409; 423/440

(58) Field of Classification Search

CPC .......... B22F 2202/13; B22F 9/12; H05H 1/42

USPC ............. 219/121.59; 423/659, 289, 435, 409, 423/412, 439, 440, 592, 606, 592.1, 610, 423/593.1, 598, 594.3, 594.1, 594.5, 594.8, 423/594.12, 594.9, 594.7, 594.13, 600, 263, 423/594.14, 594.16, 411, 492

See application file for complete search history.

(56) References Cited

U.S. PATENT DOCUMENTS 3,839,618 A * 10/1974 Muehlberger ........... 219/121.47
3,914,573 A * 10/1975 Muehlberger ............ 219/76.16

(Continued)

FOREIGN PATENT DOCUMENTS

CA 2445169 10/2002
CA 2512317 1/2006

OTHER PUBLICATIONS

Girshick et al., "Homogeneous nucleation of particles from the vapor phase in thermal plasma synthesis," *Plasma Chem. and Plasma Processing*, 9:355-369, 1989.

(Continued)

*Primary Examiner* — Dana Ross
*Assistant Examiner* — Ket D Dang
(74) *Attorney, Agent, or Firm* — Fulbright & Jaworski LLP

(57) ABSTRACT

A process and apparatus for preparing a nanopowder are presented. The process comprises feeding a reactant material into a plasma reactor in which is generated a plasma flow having a temperature sufficiently high to vaporize the material; transporting the vapor with the plasma flow into a quenching zone; injecting a preheated quench gas into the plasma flow in the quenching zone to form a renewable gaseous condensation front; and forming a nanopowder at the interface between the renewable controlled temperature gaseous condensation front and the plasma flow.

40 Claims, 10 Drawing Sheets

(56) References Cited

U.S. PATENT DOCUMENTS

| | | | | |
|---|---|---|---|---|
| 4,361,441 | A * | 11/1982 | Tylko | 373/22 |
| 4,982,067 | A * | 1/1991 | Marantz et al. | 219/121.47 |
| 5,144,110 | A * | 9/1992 | Marantz et al. | 219/121.48 |
| 5,233,153 | A * | 8/1993 | Coats | 219/121.47 |
| 5,851,507 | A * | 12/1998 | Pirzada et al. | 423/659 |
| 6,254,940 | B1 * | 7/2001 | Pratsinis et al. | 427/562 |
| 6,372,156 | B1 * | 4/2002 | Kong et al. | 252/373 |
| 6,379,419 | B1 * | 4/2002 | Celik et al. | 75/346 |
| 2003/0143153 | A1 | 7/2003 | Boulos et al. | 423/592.1 |
| 2003/0145681 | A1 * | 8/2003 | El-Shall et al. | 75/345 |
| 2005/0120957 | A1 * | 6/2005 | Kowalsky et al. | 118/723 E |
| 2005/0217421 | A1 * | 10/2005 | Boulos et al. | 75/10.19 |
| 2005/0244693 | A1 * | 11/2005 | Strutt et al. | 429/32 |
| 2005/0258149 | A1 * | 11/2005 | Glukhoy et al. | 219/121.48 |
| 2007/0029291 | A1 | 2/2007 | Boulos et al. | 219/121.59 |

OTHER PUBLICATIONS

Okuyama et al., "Production of ultrafine metal oxide aerosol particles by thermal decomposition of metal alkoxide vapors," *AlChE Journal*, 32:2010-2019, 1988.

* cited by examiner

PLASMA SYNTHESIS OF NANOPOWDERS

This Application claims priority to U.S. Provisional Application No. 60/779,968 filed on Mar. 8, 2006, which is incorporated herein by reference in its entirety.

FIELD OF THE INVENTION

The present invention relates to the plasma synthesis of nanopowders using plasma technology. More specifically, but not exclusively, the present invention relates to a process and apparatus for the synthesis of nanopowders of various materials such as metals, alloys, ceramics and composites by induction plasma torch, direct current plasma torch or transferred arc plasma technology.

BACKGROUND OF THE INVENTION

The plasma synthesis of nanopowders has attracted increasing attention over the past few years. Numerous processes have been developed for preparing metal, alloy and ceramic-based nanopowders using a wide range of technologies comprising inductively coupled plasma discharge, arc discharge, electro-explosion, self propagating high temperature synthesis, combustion synthesis, electric discharge, spray pyrolysis, sol-gel, and mechanical attrition.

High temperature plasma processing routes are based on the concept of heating the reactant precursors (in solid, liquid or vapor/gaseous form), to relatively high temperatures, followed by rapid cooling of the reaction products through their mixing with a cold gas stream as in the "high intensity turbulent quench technique" or through their contacting with a cold surface on which the nanoparticles form and deposit. However, a drawback of the use of traditional "cold-surface" condensation techniques is that the nature and the temperature of the condensation surface changes with the build-up of the condensed nanopowder layer. The use of a "highly turbulent gas quench zone" has been previously described by Boulos et al. in U.S. 20050217421 and U.S. 20030143153 filed on Mar. 25, 2005 and Dec. 6, 2002 respectively. The use of a renewable gaseous cold front has been previously described by Boulos et al. in U.S. 20070029291 as filed on Jan. 27, 2006. A common objective to all of these processes is the desire to closely control the particle morphology, the particle crystallinity, the particle size distribution, and the agglomeration of the powders obtained.

U.S. Pat. No. 6,379,419 issued to Celik et al. on Apr. 30, 2002 discloses a transferred arc thermal plasma based vapor condensation method for the production of fine and ultra fine powders. The method calls upon a conventional two-step condensation (i.e. cooling) procedure including an indirect cooling step and a direct cooling step. The indirect cooling step involves a cooling surface whereas the direct cooling step involves the injection of a cooling fluid, liquid or gaseous, directly onto the vapor. The vapor laden stream of hot gas is first subjected to an indirect cooling or heating section providing for a control over the growth and crystallization of the particles, followed by a direct cooling section wherein the cooling is performed by injecting a fluid, liquid or gaseous, directly onto the vapor and aerosol laden stream. The use of a cooling surface suffers from the drawback of particle build-up on the condensation surface.

It has been shown theoretically that by controlling the initial vapor concentration and temperature, residence time of particle nucleation and growth, and cooling profile, one may have some control on the particle size distribution and crystallinity. This is shown by Okuyama et al. in AlChE Journal, 1986, 32 (12), 2010-2019 and Girshick et al. in Plasma Chem. and Plasma Processing, 1989, 9 (3), 355-369. However, these references remain silent as to an efficient method for producing nanopowders of well defined particle size distribution and morphology.

The present invention refers to a number of documents, the content of which is herein incorporated by reference in their entirety.

SUMMARY OF THE INVENTION

The present invention relates to an improved process and apparatus for the preparation of nanopowders in which the particle morphology, the particle size distribution, and the agglomeration of particles is readily controlled and which process is easily scalable.

In an embodiment, the present invention relates to the plasma synthesis of nanopowders calling upon radio frequency (r.f.) inductively coupled plasma torch, direct current (d.c.) plasma torch or transferred arc plasma technology. More specifically, as broadly claimed, the present invention relates to an apparatus comprising: (a) a plasma source (i.e. "high temperature precursor vaporization zone") in which a superheated vapor is generated from a reactant material in the form of molten metal droplets or a molten metal pool of solid particles; (b) a quenching chamber in which a renewable laminar "controlled temperature gaseous condensation front" is generated through the injection of a preheated quench gas in an upstream section of the quench zone, followed by the injection of progressively cooler quench gases in a downstream section of the quench zone, on which front the gaseous reactants/reaction products condense and nucleate; and (c) a nanopowder collection zone.

In an embodiment, the present invention relates to an apparatus for producing nanopowders comprising:

a plasma torch to generate a plasma flow and to produce a vapour from a reactant material supplied to the plasma torch; and a quenching chamber mounted to the plasma torch downstream therefrom and in fluid communication with the plasma torch to receive the vapour from the plasma torch, the quenching chamber comprising an upstream hot quench section and a downstream cold quench section, the upstream hot quench section being configured to receive a preheated quench gas and to generate from said quench gas a renewable gaseous condensation front.

The nucleation generates a nanopowder which is rapidly transported to a collection chamber (i.e. "collection zone") by the moving gaseous condensation front. It was surprisingly discovered that by independently controlling the temperature and chemical composition of the renewable gaseous condensation front (for nucleating (i.e. condensing) the reactants/reaction products present in the plasma flow), excellent control of the chemistry, morphology, uniformity and particle size distribution of the resulting nanopowder could be achieved. Moreover, the renewable controlled temperature gaseous condensation front offers close control over particle agglomeration since the front rapidly transports the nanopowders out of the quenching zone, thus reducing the possibility for generating larger particles through agglomeration. The apparatus of the present invention offers the additional advantages of being compact, scalable and simple to operate.

In an embodiment, the present invention relates to a process for the plasma synthesis of nanopowders using r.f. inductively coupled plasma, d.c. plasma or transferred arc plasma technology and calling upon a renewable "controlled temperature gaseous condensation front", for example a laminar "controlled temperature gaseous condensation front" which serves to rapidly quench the reactants/reaction products present in the plasma flow.

In an embodiment, the present invention relates to a process for the plasma synthesis of nanopowders comprising;

feeding a reactant material into a plasma reactor in which is generated a plasma flow having a temperature sufficiently high to vaporize the material;

transporting the vapour by means of the plasma flow into a quenching zone;

injecting a preheated quench gas into the plasma flow in the quenching zone to form a renewable gaseous condensation front; and forming a nanopowder at the interface between the renewable condensation front and the plasma flow.

The foregoing and other objects, advantages and features of the present invention will become more apparent upon reading of the following non restrictive description of illustrative embodiments thereof, given by way of example only with reference to the accompanying drawings.

DETAILED DESCRIPTION OF ILLUSTRATIVE EMBODIMENTS

Figure 1A:
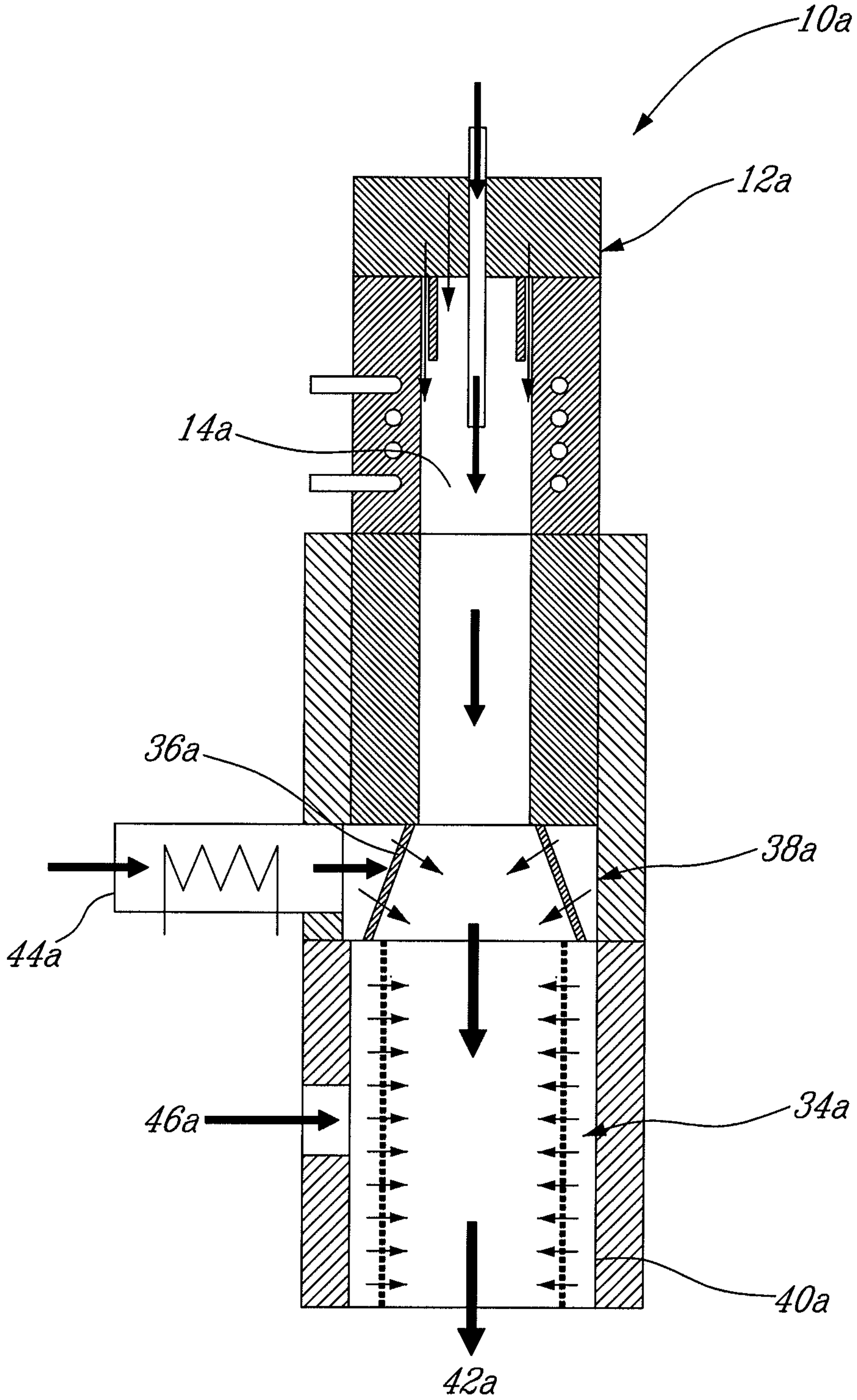
FIG. 1*a* is a cross-sectional side-elevation view of an apparatus in accordance with an embodiment of the present invention, comprising an r.f. inductively coupled plasma reactor (i.e. high temperature precursor vaporization zone) and a quenching zone in a generally vertical configuration relative to one another.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this invention pertains.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

The present invention relates to the plasma synthesis of nanopowders calling upon r.f. inductively coupled plasma, d.c. plasma or transferred arc plasma technology. More specifically, as broadly claimed, the present invention relates to a process for the plasma synthesis of nanopowders using r.f. inductively coupled plasma, d.c. plasma or transferred arc plasma technology comprising producing a renewable "controlled temperature gaseous condensation front", for example a laminar "controlled temperature gaseous condensation front" which serves to rapidly quench the reactants/reaction products present in the plasma flow.

According to a first embodiment, the process of the present invention comprises the vaporization of a metallic feed (i.e. molten metal droplets or a molten metal pool maintained in a refractory ceramic crucible and heated by a d.c. transferred arc). As the vapors emerge from the vaporization zone (i.e. plasma torch or the transferred arc furnace) they are mixed with and transported by a stream of hot gas, composed of one or more plasma gases optionally mixed with an external, preheated, secondary sheath gas stream, from the vaporization zone to the quenching zone of the reactor (i.e. apparatus). Upon reaching the quenching zone, the vapor laden stream of hot plasma gas is confronted by a renewable "controlled temperature gaseous condensation front" which can be generated through the uniform injection of a preheated quench gas across a porous metal or ceramic wall, or a perforated refractory wall of a quenching chamber. The temperature of the renewable "controlled temperature gaseous condensation front" can be controlled through a preheating of the quench gas upstream from the point of injection into the quench zone. In a particular embodiment of the present invention, the quenching chamber comprises a perforated refractory wall for injecting the preheated quench gas. Even though the use of a quenching chamber equipped with a porous metal or ceramic wall is within the scope of the present invention, a perforated refractory wall provides for a wider range of quench gas temperatures and optimal control of the condensation process.

The process, according to an embodiment of the present invention, comprises producing a renewable "controlled temperature gaseous condensation front" as an effective means of controlling the uniformity and particle size distribution of the nanopowder produced. Through proper control of the temperature profile along the quenching zone, an effective control can be exercised on the vapor condensation (i.e. nucleation) and thus the particle growth process, the morphology and the particle size distribution of the particles making up the nanopowder. The subsequent steps of the process comprise further cooling of the nanopowder and the gas stream, and the collection of the nanopowder in an appropriate filter. In an embodiment of the present invention, the subsequent cooling can be achieved using conventional cyclonic heat exchangers. The renewable, controlled temperature gaseous condensation front substantially eliminates the risk of powder condensation on the inner surfaces of the reactor, ensuring a more streamlined and continuous quenching zone in which the gaseous reactants/reaction products condense and nucleate.

The process of the present invention comprises producing a renewable controlled temperature gaseous condensation front by means of injecting a preheated quench gas into a quenching zone comprising a quenching chamber equipped with either a perforated refractory wall or a porous metal or ceramic wall. The renewable controlled temperature gaseous condensation front provides for a continuous and stable condensation process. Moreover, controlling the temperature profile along the centerline of the quenching zone provides for improved control over the physical characteristics (i.e. particle morphology, particle size and particle size distribution) of the nanopowder product. In an embodiment, the process of the present invention provides for improved quality control of the nanopowder product as well as being scalable and simple to operate.

Figure 1B:
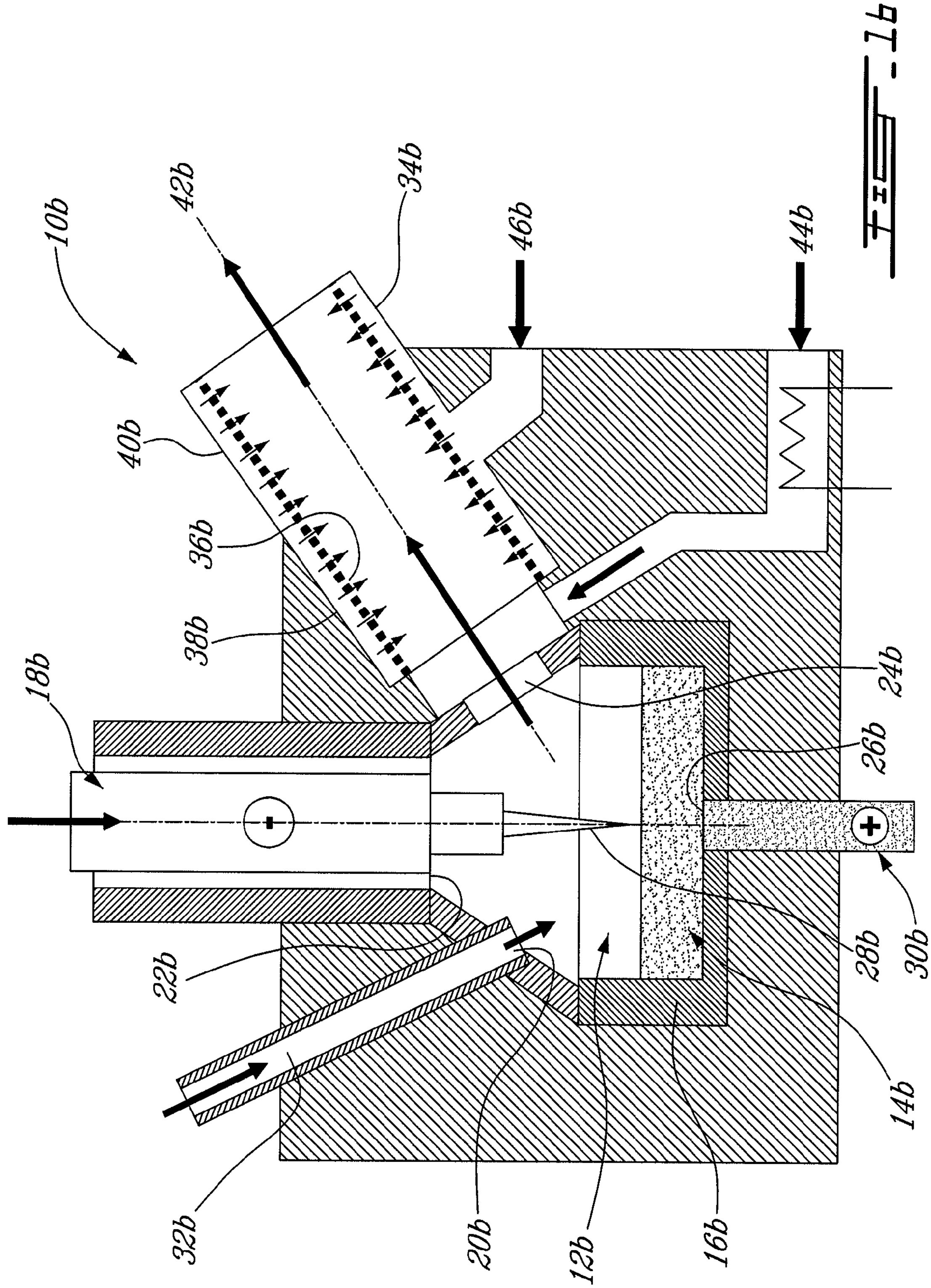
FIG. 1*b* is a cross-sectional side-elevation view of an apparatus in accordance with a further embodiment of the present invention, comprising a transferred arc plasma reactor (i.e. high temperature precursor vaporization zone) and a temperature controlled quenching zone in a slanted configuration relative to one another.
Figure 1C:
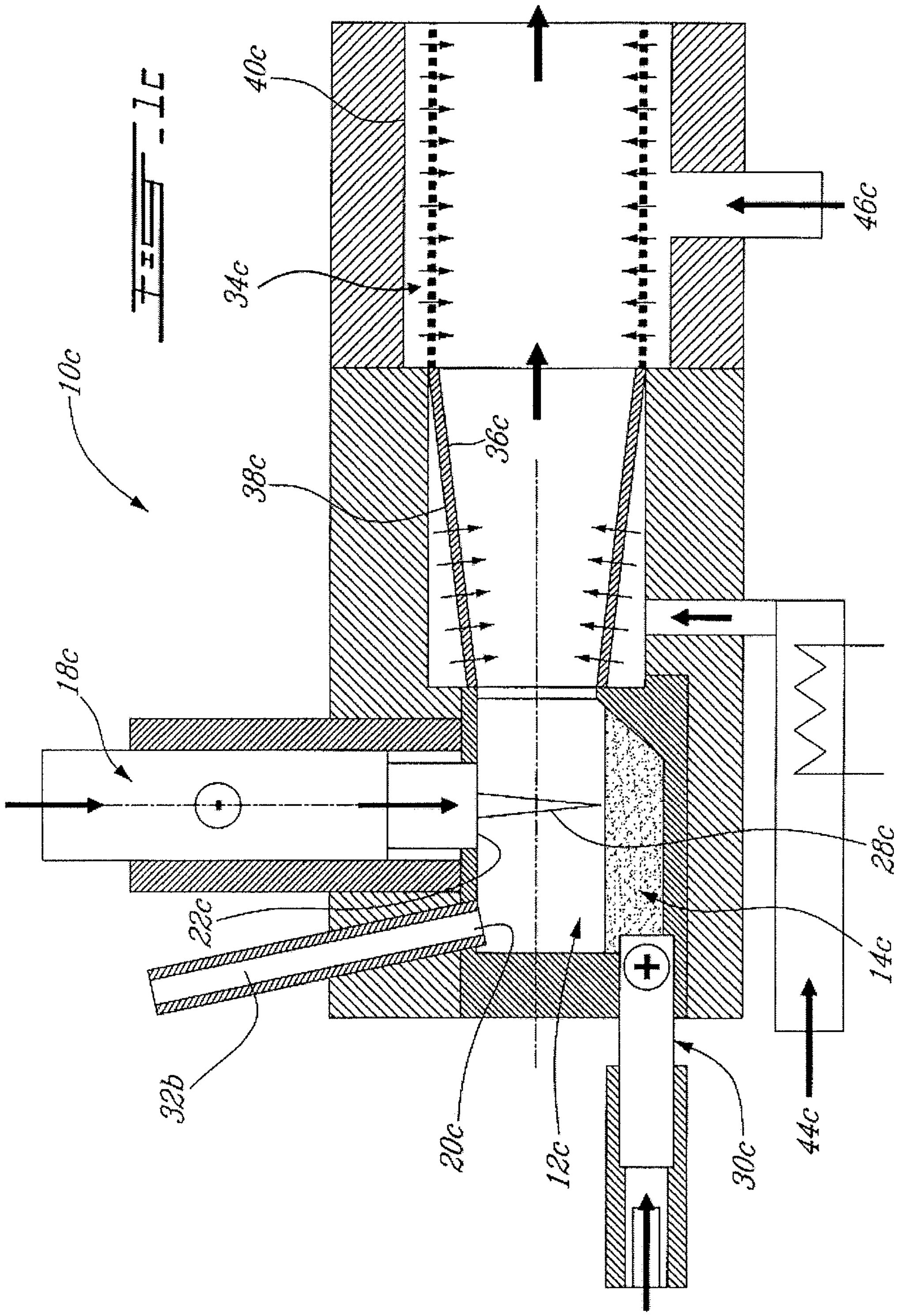
FIG. 1*c* is a cross-sectional side-elevation view of an apparatus in accordance with a further embodiment of the present invention, comprising a transferred arc plasma reactor (i.e. high temperature precursor vaporization zone) and a quenching zone in a generally horizontal configuration relative to one another.

FIG. 1*a*, FIG. 1*b* and FIG. 1*c* show respective illustrative embodiments of an apparatus 10*a*, 10*b* and 10*c* respectively, for producing nanopowders.

More specifically, the apparatus 10*a* is an r.f inductively coupled plasma (i.e. high temperature precursor vaporization zone) reactor assembly and the apparatuses 10*b* and 10*c* are a d.c. transferred arc plasma (i.e. high temperature precursor vaporization zone) reactor assembly.

With reference to FIG. 1*a*, in the case of an r.f. inductively coupled plasma source 12*a*, the precursor vaporization takes place in-flight from liquid droplets formed through the melting of solid particles introduced into the center of the discharge 14*a* using techniques well known to those of ordinary skill in the art. The precursor vaporization can also take place in flight from liquid droplets injected into the discharge.

With reference to FIG. 1*b*, in the case of a d.c. transferred arc plasma reactor assembly 10*b*, a central precursor vaporization zone 12*b* in which a molten metal pool 14*b* is maintained in a refractory crucible 16*b*, is vaporized or decomposed by means of the energy provided by a dc transferred arc plasma torch 18*b*. The vaporization zone 12*b* comprises a plurality of openings such as 20*b*, 22*b*, 24*b* and 26*b*. Opening 22*b* serves to introduce the tip 28*b* of the dc transferred arc plasma torch 18*b* which also serves as the cathode in the transferred arc operation. A further opening 26*b* serves to introduce the anode 30*b* connection, which is subsequently immersed in the molten metal pool 14*b*. In an embodiment of the present invention, the anode 30*b* connection can be generated through the use of a further dc transferred arc plasma torch. Yet a further opening 20*b* provides for the continuous introduction of feed material, via a feed port 32*b* into the vaporization zone 12*b* such that the molten metal pool 14*b* can be maintained at a substantially constant level. Yet a further opening 24*b* provides for the evacuation of the metal vapor laden plasma gas, optionally mixed with a torch sheath gas, to a quenching zone 34*b* (which can be a quenching chamber for example) in fluid connection or communication with the vaporization zone 12*b*. Even though the vaporization zone 12*b* and quenching zones 34*b* have been illustrated in a generally slanted configuration with respect to one another, other configurations are within the capacity of a skilled technician. A non-limiting example of such other configurations is illustrated FIG. 1*c* wherein the vaporization zone and quenching zones are in a generally horizontal configuration relative to one another.

With reference to both FIG. 1*a-c*, upon reaching the quenching zone (34*a*, 34*b*, 34*c*) the metal vapor laden stream of hot plasma gas is confronted by a renewable controlled temperature gaseous condensation front, which is generated through the uniform injection of a preheated quench gas across a porous metal or ceramic wall or a perforated refractory wall (36*a*, 36*b*, 36*c*) of a quenching chamber (i.e. hot quench section 38*a*, 38*b*, 38*c*). The quench gas can be preheated to a desired condensation temperature, providing for an effective means of controlling the condensation conditions and thus the morphology, uniformity and particle size distribution of the nanopowder produced. By maintaining the condensation temperature in the hot quench section (38*a*, 38*b*, 38*c*) of the quenching zone (34*a*, 34*b*, 34*c*) at a temperature below the melting point of the processed material, excessive particle agglomeration and deposition on the inner walls (i.e. surfaces) of the reactor (10*a*, 10*b*, 10*c*), is substantially avoided.

Individual modules further downstream of the hot quench section (38*a*, 38*b*, 38*c*) of the quenching zone (34*a*, 34*b*, 34*c*) provide for the injection of additional quench gas at different temperatures and the establishment of a predetermined temperature gradient along the centerline of the quenching zone (34*a*, 34*b*, 34*c*). Even though one additional module (i.e. cold quench section 40*a*, 40*b*, 40*c*) has been illustrated, other configurations comprising a plurality of such cold quench sections are within the capacity of a skilled technician. Controlling the temperature profile along the centerline (42*a*, 42*b*, 42*c*) of the quenching zone (34*a*, 34*b*, 34*c*) provides for an improved control over the physical characteristics (i.e. particle morphology, particle size and particle size distribution) of the final nanopowder product. Controlling the chemistry of the cold quench gas, injected at different locations in the cold quench section provides for added means of controlling the chemistry of the nanopowders produced.

FIG. 1*a*, FIG. 1*b* and FIG. 1*c* further illustrate a hot quench gas inlet (44*a*, 44*b*, 44*c*) for feeding hot quench gas into the hot quench zone (38*a*, 38*b*, 38*c*) as well as a cold quench gas inlet (46*a*, 46*b*, 46*c*) feeding cold quench gas into the cold quench zone (40a, 40b, 40c). Moreover, the hot quench gas inlet (44a, 44b, 44c) or cold quench gas inlets (46a, 46b, 46c) may also be used to feed a second reactant (such as an oxidizing gas, a carburizing agent, and a nitrating agent) into the quench zone (34a, 34b, 34c). The skilled artisan should also appreciate that such a second reagent may also be introduced directly into the plasma flow or concomitantly with the feed material.

The nature and composition of the quench gas has a direct impact on the chemical composition of the nanopowder produced. In an embodiment of the present invention the quench gas may further comprise an oxidizing gas such as oxygen. Upon reaching the quenching zone (34a, 34b, 34c), the metal vapor laden stream of hot plasma gas is confronted by a renewable controlled temperature gaseous condensation front further comprising oxygen, producing a nanopowder comprising an oxide of the precursor material. In a further embodiment of the present invention, the quench gas may further comprise a carburizing agent such as acetylene or methane. Upon reaching the quenching zone (34a, 34b, 34c), the metal vapor laden stream of hot plasma gas is confronted by a renewable controlled temperature gaseous condensation front further comprising a carburizing agent, producing a nanopowder comprising a carbide of the precursor material. In yet a further embodiment of the present invention, the quench gas may further comprise a nitriding agent such as ammonia. Upon reaching the quenching zone (34a, 34b, 34c), the metal vapor laden stream of hot plasma gas is confronted by a renewable controlled temperature gaseous condensation front further comprising a nitriding agent, producing a nanopowder comprising a nitride of the precursor material. Other quenching gas configurations are possible and are within the capacity of a skilled technician.

The effectiveness of the controlled temperature gaseous condensation front in controlling the temperature field in the quench zone (34a, 34b, 34c) is further illustrated by the results depicted in FIGS. 2-6. The results were obtained using experimental parameters typical of either r.f. or d.c. plasma evaporation, quenching zones operating at atmospheric pressure and using an argon/hydrogen (80/20% vol) plasma. The temperature of the metal vapor laden plasma gas at the exit of the high temperature precursor vaporization zone was set at 5000 K with a total gas flow rate of 90 slpm (11% vol. $H_2$ in the mixture). The quench gas flow rate was set at 400 slpm (pure Argon) and the quench gas injection temperatures were set at 700 K (Case 1), 1000 K (Case 2) and 1200 K (Case 3) respectively. The flow rate and temperature of additional quench gas (Ar) injected in the "cold quench section" of the quenching zone, located further downstream of the "hot quench section", was set at 2000 slpm and 300 K respectively.

Figure 2:
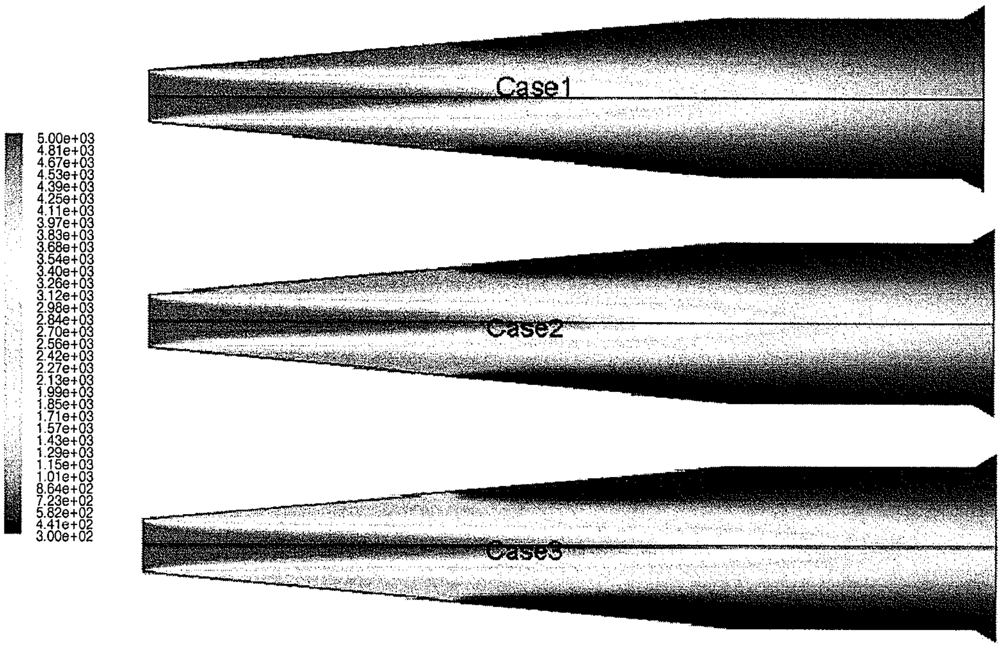
FIG. 2 is an illustration of the temperature isocontours in the quenching zone of either of the plasma reactors of FIG. 1 using an $Ar/H_2$ plasma gas flow at 5000 K and a quench gas flow rate of 400 slpm, wherein the quench gas is at 700 K (Case 1), 1000 K (Case 2) and 1200 K (Case 3) respectively.
Figure 3:
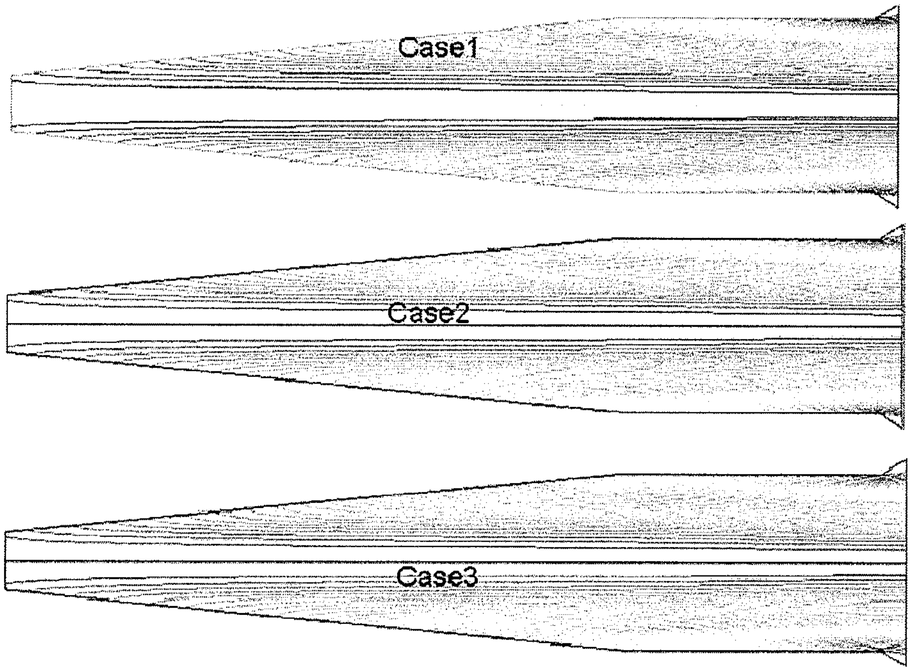
FIG. 3 is an illustration of the flow stream lines in the quenching zone of either of the plasma reactors of FIG. 1 using an $Ar/H_2$ plasma gas flow at 5000 K and a quench gas flow rate of 400 slpm, wherein the quench gas is at 700 K (Case 1), 1000 K (Case 2) and 1200 K (Case 3) respectively.
Figure 4:
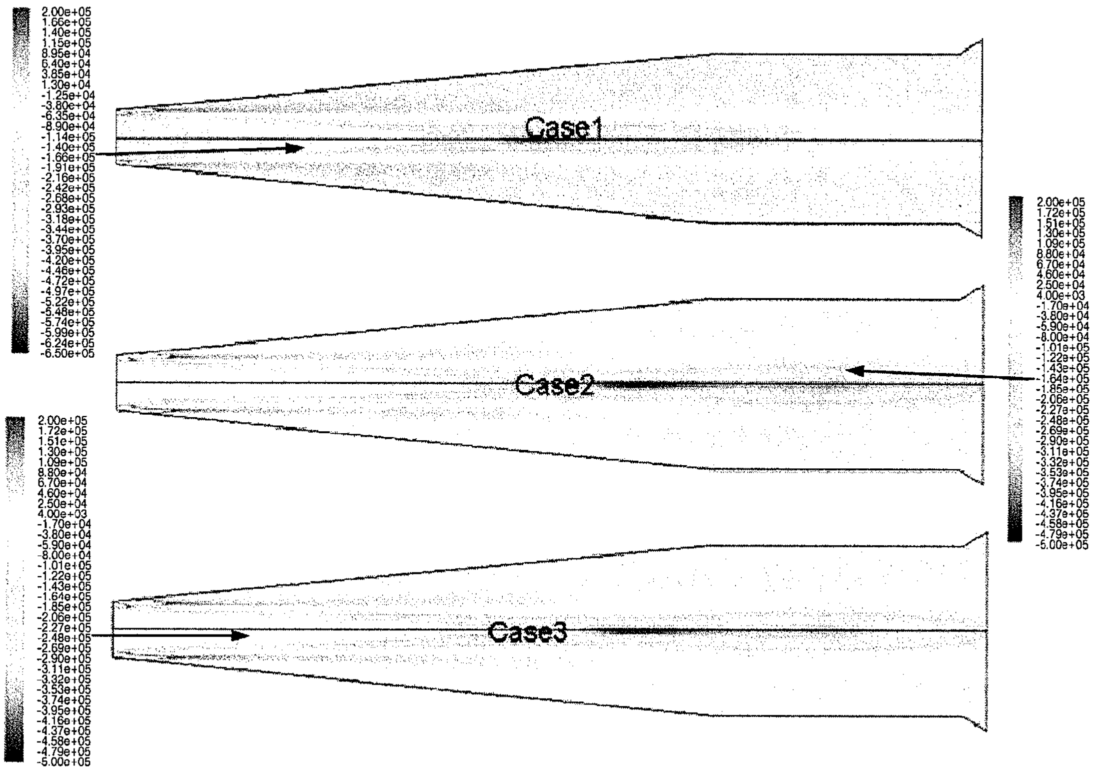
FIG. 4 is an illustration of the gas cooling rate isocontours in the quenching zone of either of the plasma reactors of FIG. 1 using an $Ar/H_2$ plasma gas flow at 5000 K and a quench gas flow rate of 400 slpm, wherein the quench gas is at 700 K (Case 1), 1000 K (Case 2) and 1200 K (Case 3) respectively.

Typical temperature isocontours, flow stream lines, and gas cooling rate isocontours as observed in the quenching zone are illustrated in FIGS. 2, 3, and 4 respectively. As can be observed from the Figures, the core temperature of the plasma gases entering the quench section is relatively uniform at 5000 K. Moreover, distinctly different gaseous condensation fronts are generated in the hot section of the quenching chamber, depending on the temperature of the injected quench gas.

Figure 5:
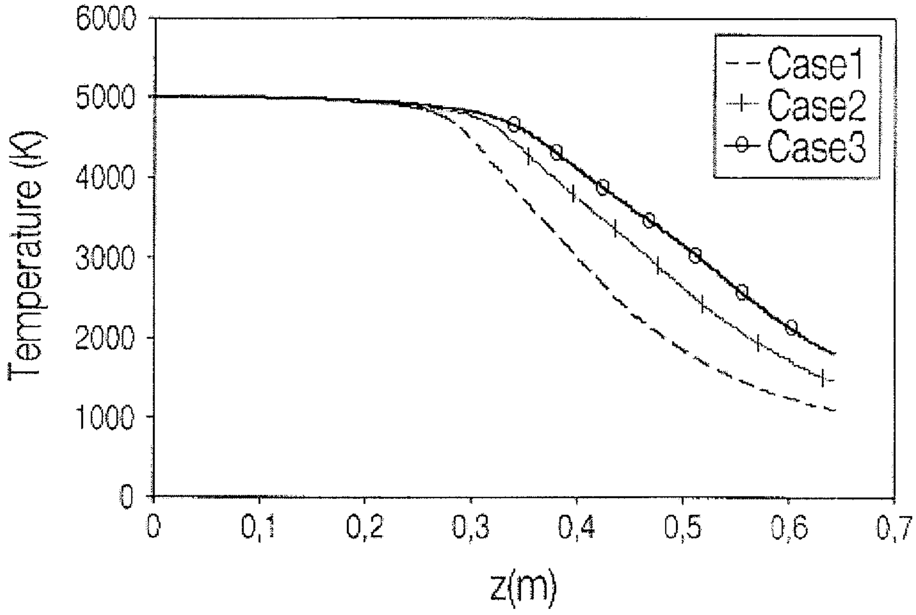
FIG. 5 is a graph illustrating temperature profiles along the centerline of the quenching zone of either of the plasma reactors of FIG. 1 using an $Ar/H_2$ plasma gas flow at 5000 K and a quench gas flow rate of 400 slpm, wherein the quench gas is at 700 K (Case 1), 1000 K (Case 2) and 1200 K (Case 3) respectively.
Figure 6:
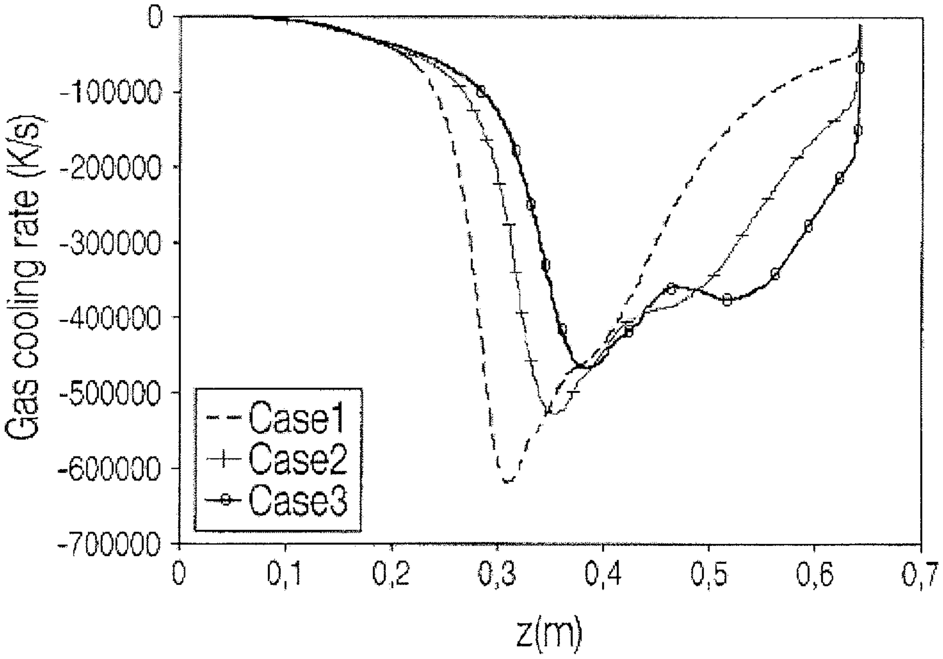
FIG. 6 is a graph illustrating the gas cooling rate along the centerline of the quenching zone of either of the plasma reactors of FIG. 1 using an $Ar/H_2$ plasma gas flow at 5000 K and a quench gas flow rate of 400 slpm, wherein the quench gas is at 700 K (Case 1), 1000 K (Case 2) and 1200 K (Case 3) respectively.

As illustrated in FIG. 5, increasing the quench gas temperature from 700 K to 1200 K significantly reduces the severity of the quench rate. Moreover, as illustrated in FIG. 6, increasing the quench gas temperature from 700 K to 1200 K reduces the plasma gas cooling rate which is of importance for a proper control over the vapor condensation process (i.e. nucleation) and thus the particle growth process, the particle morphology and the particle size and particle size distribution of the particles making up the nanopowder. Additionally, as illustrated in FIG. 5, the temperature of the gases along the centerline of the quenching zone drops-off more gradually with increasing quench gas temperatures.

As illustrated in FIG. 6, the effect of the quench gas temperature on the cooling rate of the plasma gases is significant. The results indicate that an increase of the quench gas temperature from 700 K to 1200 K, leads to a decrease of the maximum cooling rate form $6\times10^5$ K/s to $5\times10^5$ K/s. Moreover, the location of the peak indicative of maximal plasma gas cooling rate is shifted in the downstream direction by about 0.1 meters.

Figure 7B:
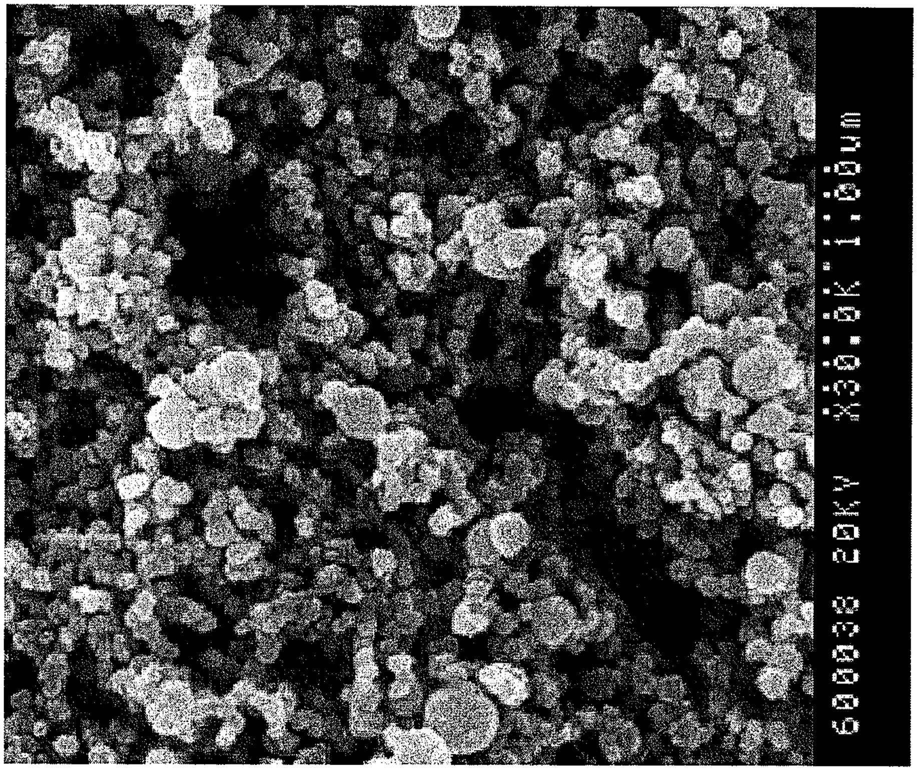
FIG. 7 is a Scanning Electron Microscope (SEM) micrograph of a copper nanopowder produced in accordance with the present invention (Transferred Arc: Plasma Gas: Ar 20 slpm, $N_2$ 20 slpm; Arc current: 500 A; Power Level: 55 kW, Chamber Pressure: 66 kPa; Quench Flow (recycled argon and nitrogen): 3300 slpm; Passivation: Air 8 slpm).
Figure 7A:
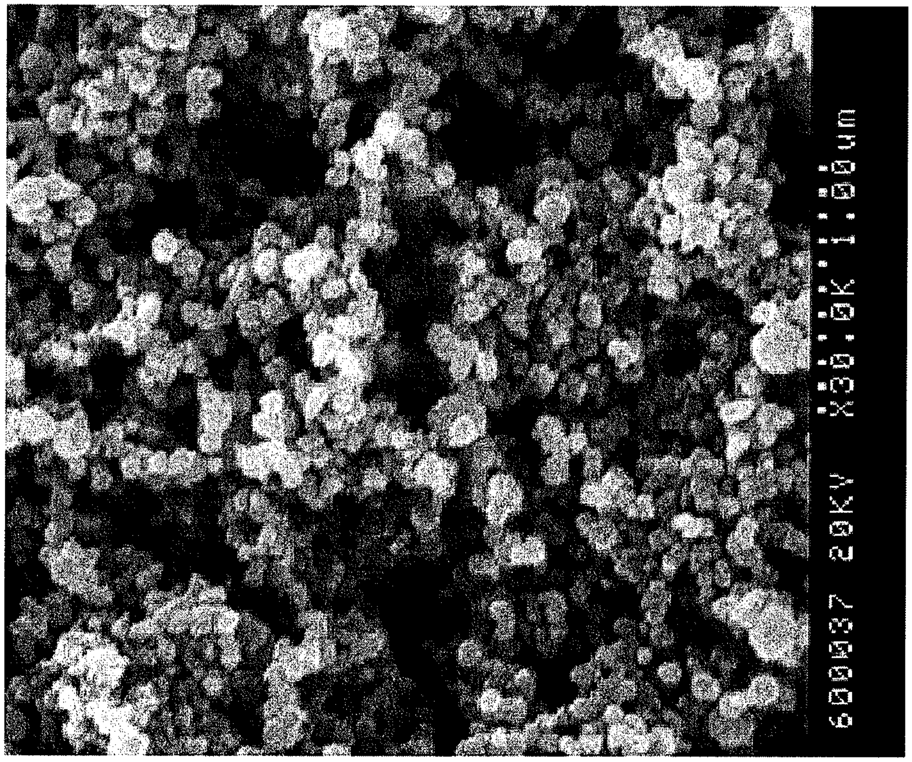

A Scanning Electron Microscope (SEM) micrograph of a copper nanopowder produced in accordance with the present invention is illustrated in FIG. 7. The mean particle size was measured to be 100 nm and the BET specific surface area was measured to be 6.72 $m^2$/g.

Figure 8:
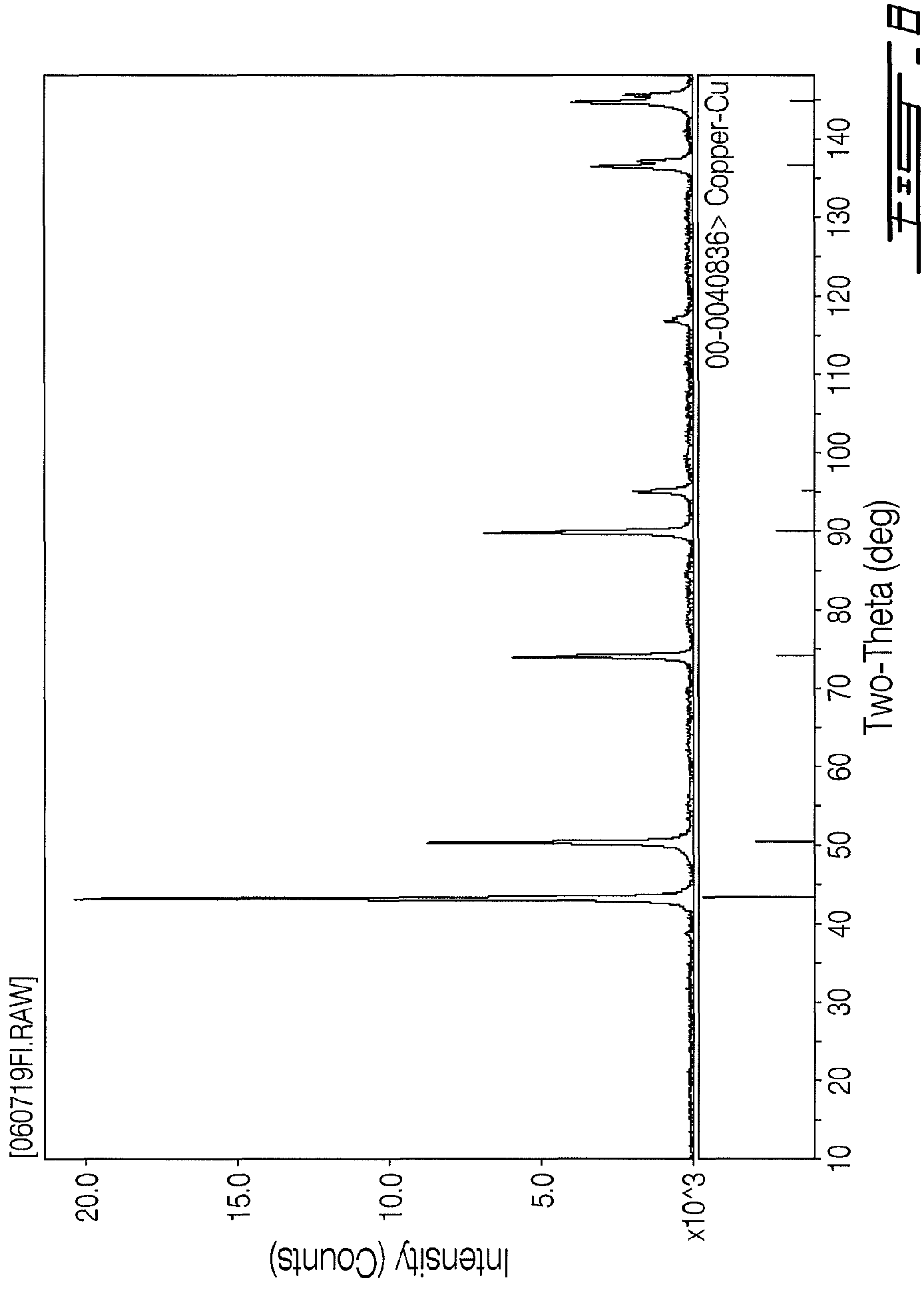
FIG. 8 is an X-Ray Diffraction Pattern of a copper nanopowder produced in accordance with the present invention.
Figure 9A:
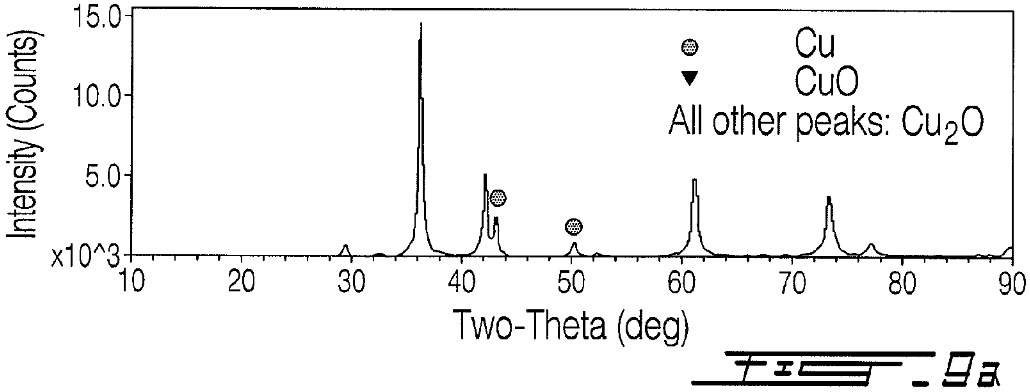
FIG. 9 is an X-Ray Diffraction Pattern of a copper oxide nanopowder produced in accordance with the present invention.
Figure 9B:
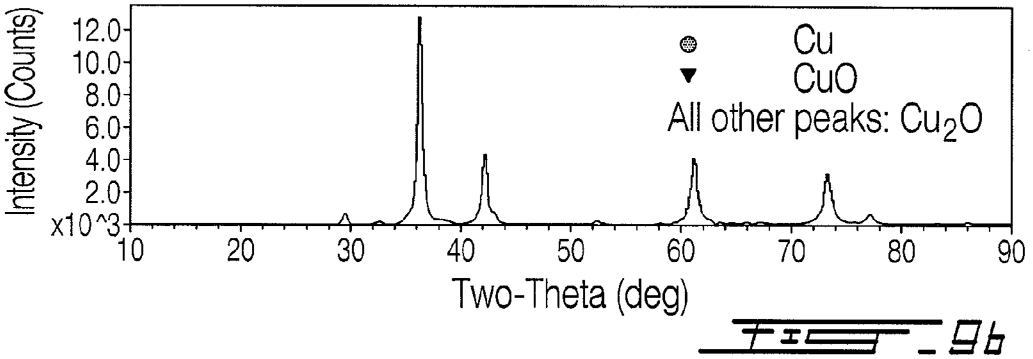
Figure 9C:
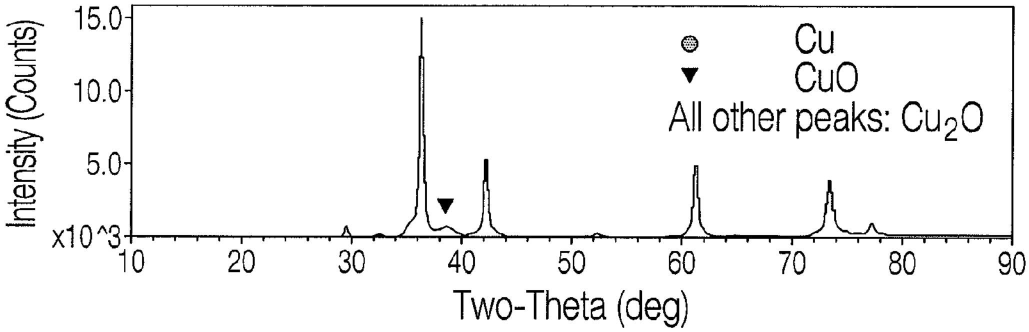
Figure 9D:
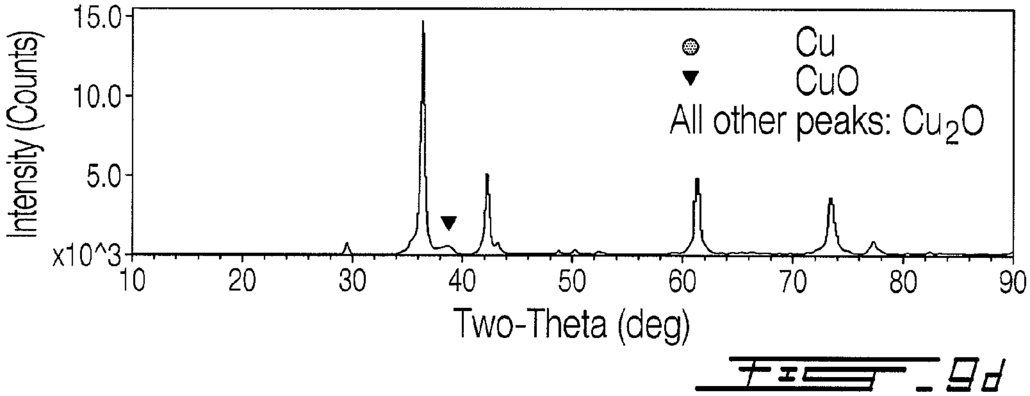

An X-Ray Diffraction Pattern of a copper nanopowder produced in accordance with the present invention is illustrated in FIG. 8. The diffraction pattern is indicative of a pure metallic copper powder.

An X-Ray Diffraction Pattern of a copper oxide nanopowder produced in accordance with the present invention is illustrated in FIG. 9. The diffraction pattern is indicative of a pure metallic copper powder.

Figure 10C:
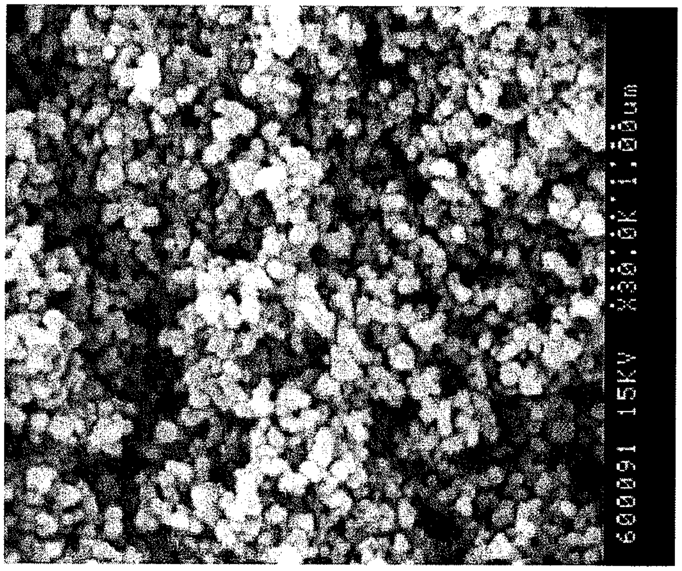
FIG. 10 is a Scanning Electron Microscope (SEM) micrograph of a copper oxide nanopowder (BET specific surface area=14.8 $m^2/g$) produced in accordance with the present invention (Transferred Arc: Plasma Gas: Ar 20 slpm, $N_2$ 20 slpm; Arc current: 500 A; Power Level: 55 kW, Chamber Pressure: 66 kPa; Quench Flow (recycled argon and nitrogen): 1770 slpm; Reactive gas: oxygen 10 slpm).
Figure 10B:
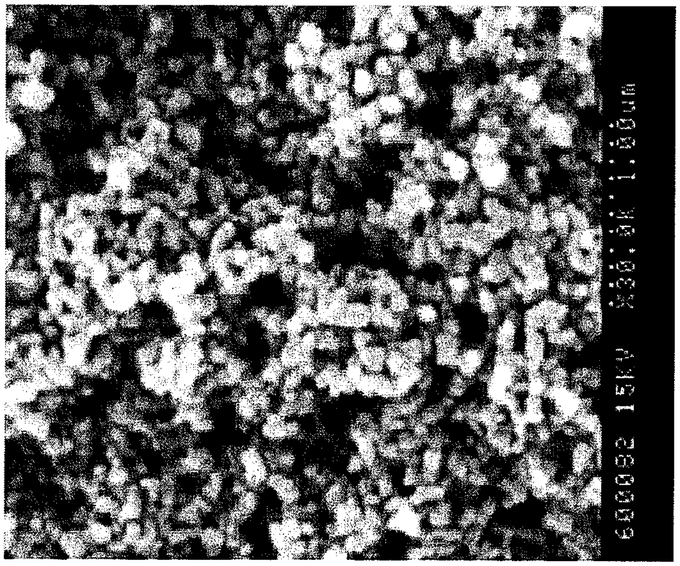
Figure 10A:
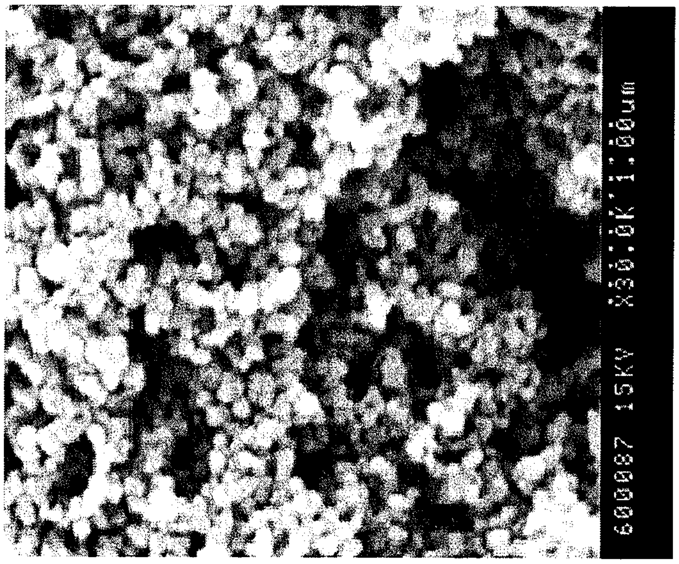

A Scanning Electron Microscope (SEM) micrograph of a copper oxide nanopowder produced in accordance with the present invention is illustrated in FIG. 10. The BET specific surface area was measured to be 14.8 $m^2$/g.

It is to be understood that the invention is not limited in its application to the details of construction and parts as described hereinabove. The invention is capable of other embodiments and of being practiced in various ways. It is also understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. An apparatus for producing nanopowders comprising:

a) a plasma torch to generate a plasma flow and to produce a vapour from a reactant material supplied to the plasma torch; and b) a quenching chamber mounted to the plasma torch downstream therefrom and in fluid communication with said plasma torch to receive the vapour from the plasma torch and condense said vapour into the nanopowders, said quenching chamber comprising:

i) an upstream hot quench section supplied with a first quench gas preheated to a vapour condensation temperature lower than a melting point of the reactant material, the first quench gas preheated to the vapour condensation temperature being injected into the upstream hot quench section to generate in the quenching chamber a renewable controlled-temperature gaseous condensation front, wherein the vapour condensation temperature of the first, pre-heated quench gas controls at least one physical property of the nanopowders from particle morphology, particle uniformity, particle size and particle size distribution;

ii) at least one downstream cold quench section supplied with a second quench gas at a temperature lower than the vapour condensation temperature of the first, pre-heated quench gas to control a temperature profile along the quenching chamber to improve at least one physical property of the nanopowders from particle morphology, particle size and particle size distribution.

2. The apparatus of claim 1, wherein the quenching chamber comprises a slanted position relative to the plasma torch.

3. The apparatus of claim 1, further comprising a collection chamber to collect the nanopowder.

4. The apparatus of claim 1, wherein the gaseous condensation front exerts a constricting effect on the plasma flow.

5. The apparatus of claim 4, wherein the constricting effect is proportional to the quench gas flow rate.

6. The apparatus of claim 1, wherein the upstream hot quench section of the quenching chamber comprises a wall section comprising a plurality of openings for injecting the first quench gas in the upstream hot quench section of the quenching chamber.

7. The apparatus of claim 6, wherein the wall section is a porous wall section.

8. The apparatus of claim 6, wherein the wall section is a slotted wall section.

9. The apparatus of claim 6, wherein the wall section is a perforated wall section.

10. The apparatus of claim 1, wherein said vapour is at a reaction temperature capable of reacting with said plasma flow, with said first and second quench gases, or with both said plasma flow and said first and second quench gases.

11. The apparatus of claim 1, wherein the reactant material is selected from the group consisting of metals, alloys, organometallic compounds, chlorides, bromides, fluorides, iodides, nitrites, nitrates, oxalates, carbonates, oxides and composites.

12. The apparatus of claim 1, further comprising an inlet for feeding a second reactant in the plasma flow.

13. The apparatus of claim 12, wherein the inlet is configured to inject the second reactant into the plasma torch.

14. The apparatus of claim 12, wherein the inlet is configured to inject the second reactant into the quenching zone.

15. The apparatus of claim 12, wherein the second reactant is the first or second quench gas.

16. The apparatus of claim 12, wherein the second reactant is an oxidizing gas.

17. The apparatus of claim 12, wherein the second reactant is a carburizing agent.

18. The apparatus of claim 12, wherein the second reactant is a nitrating agent.

19. The apparatus of claim 12, further comprising a reactor, said reactor being in fluid communication with the plasma torch and the quenching chamber, and said reactor being disposed between the plasma torch and the quenching chamber.

20. The apparatus of claim 1, wherein said preheated quench gas and said second quench gas are configured to create the temperature profile along a centerline of the quenching chamber.

21. A process for synthesizing a nanopowder comprising:

a) feeding a reactant material into a plasma reactor in which is generated a plasma flow having a temperature sufficiently high to vaporize said material;

b) transporting said plasma flow into a downstream quenching zone comprising an upstream hot quench section and a downstream cold quench section to condense the vaporised reactant material into the nanopowder;

c) injecting:

i) a first quench gas preheated to a vapour condensation temperature lower than a melting point of the reactant material into the plasma flow in said upstream hot quench section, the first quench gas preheated to the vapour condensation temperature and injected into the upstream hot quench section generating in the quenching zone a renewable controlled temperature gaseous condensation front, wherein the vapour condensation temperature of the first, pre-heated quench gas controls at least one physical property of the nanopowder from particle morphology, particle uniformity, particle size and particle size distribution; and ii) a second quench gas at a temperature lower than the vapour condensation temperature of the first, preheated quench gas into the plasma flow in said downstream cold quench section to control a temperature profile along the quenching zone to improve at least one physical property of the nanopowder from particle morphology, particle size and particle size distribution; and d) forming the nanopowder at the interface between the renewable condensation front and the plasma flow.

22. The process of claim 21, wherein the quenching zone comprises a slanted position relative to the plasma reactor.

23. The process of claim 21 further comprising collecting the nanopowder in a collection zone.

24. The process of claim 21, wherein the gaseous condensation front exerts a constricting effect on the plasma flow.

25. The process of claim 24, wherein the constricting effect is proportional to the quench gas flow rate.

26. The process of claim 21, comprising injecting the preheated quench gas in the quenching upstream hot quench section of the zone through a plurality of openings in a wall section of said upstream hot quench section of the quenching zone.

27. The process of claim 26, wherein the plurality of openings define a porous wall section.

28. The process of claim 26, wherein the plurality of openings define a slotted wall section.

29. The process of claim 26, wherein the plurality of openings define a perforated wall section.

30. The process of any one of claim 26, 27, 28 or 29, wherein the quenching zone is a quenching chamber.

31. The process of claim 21, wherein said vapour is at a reaction temperature capable of reacting with said plasma flow, with said first and second quench gases, or with both said plasma flow and said first and second quench gases.

32. The process of claim 21, wherein the reactant material is selected from the group consisting of metals, alloys, organometallic compounds, chlorides, bromides, fluorides, iodides, nitrites, nitrates, oxalates, carbonates, oxides and composites.

33. The process of claim 21, further comprising:

a) feeding a second reactant in the plasma flow; and b) reacting the second reactant with the reactant material to produce the nanopowder of chemical composition different from the reactant material.

34. The process of claim 33, comprising injecting the second reactant into the plasma torch.

35. The process of claim 33, comprising injecting the second reactant into the quenching zone.

36. The process of claim 33, wherein the second reactant is the first or second quench gas.

37. The process of claim 33, wherein the second reactant is an oxidizing gas.

38. The process of claim 33, wherein the second reactant is a carburizing agent.

39. The process of claim 33, wherein the second reactant is a nitrating agent.

40. The process of claim 21, wherein the temperature profile is created along a centerline of the quenching zone.

* * * * *